United States Patent
Roman-Barcelo

(10) Patent No.: US 7,347,166 B2
(45) Date of Patent: Mar. 25, 2008

(54) PET VACUUM ATTACHMENT

(76) Inventor: Hector Roman-Barcelo, Kurices 846, San Juan, PR (US) 00924

( * ) Notice: Subject to any disclaimer, the term of this patent is extended or adjusted under 35 U.S.C. 154(b) by 141 days.

(21) Appl. No.: 11/102,815

(22) Filed: Apr. 11, 2005

(65) Prior Publication Data

US 2006/0225665 A1    Oct. 12, 2006

(51) Int. Cl.
*A01K 13/00* (2006.01)
*A47L 5/24* (2006.01)

(52) U.S. Cl. ......................... 119/677; 15/344

(58) Field of Classification Search ............... 119/677, 119/652, 600; 15/344, 300.1, 227, 315, 402, 15/393, 398
See application file for complete search history.

(56) References Cited

U.S. PATENT DOCUMENTS

| | | | | |
|---|---|---|---|---|
| 1,770,749 A | * | 7/1930 | Engberg et al. ............... | 15/367 |
| 1,808,178 A | * | 6/1931 | Santini ........................ | 15/399 |
| 2,159,096 A | * | 5/1939 | Mitchell ....................... | 601/7 |
| 2,663,890 A | * | 12/1953 | Sullins ......................... | 401/7 |
| 3,574,885 A | | 4/1971 | Jones | |
| 4,279,095 A | * | 7/1981 | Aasen .......................... | 43/139 |
| D272,568 S | * | 2/1984 | Kuhl ........................... | D30/158 |
| 4,656,687 A | * | 4/1987 | Wei ............................. | 15/324 |
| 4,766,914 A | * | 8/1988 | Briggs ......................... | 132/212 |
| 4,799,460 A | * | 1/1989 | Kuhl ............................ | 15/344 |
| 5,095,853 A | * | 3/1992 | Kruger ......................... | 119/606 |
| 5,211,131 A | | 5/1993 | Plyler | |
| 5,502,873 A | * | 4/1996 | Hogan .......................... | 15/393 |
| 5,524,575 A | | 6/1996 | Lennon | |
| 5,718,016 A | | 2/1998 | Sung | |
| 5,768,709 A | * | 6/1998 | Newkirk et al. ............... | 2/160 |
| 5,768,748 A | * | 6/1998 | Silvera et al. ................ | 15/402 |
| 5,924,202 A | * | 7/1999 | Romani ........................ | 30/133 |
| D444,925 S | * | 7/2001 | Monette ..................... | D30/158 |
| 6,336,428 B1 | * | 1/2002 | Locke .......................... | 119/625 |
| D483,536 S | * | 12/2003 | Martin ......................... | D32/31 |
| D506,585 S | * | 6/2005 | Muller et al. ................ | D32/32 |
| 2002/0189049 A1 | | 12/2002 | Preidell | |

FOREIGN PATENT DOCUMENTS

DE      4205693     8/1993
WO    WO 95/14420   6/1995

* cited by examiner

*Primary Examiner*—Yvonne R. Abbott
(74) *Attorney, Agent, or Firm*—Richard C. Litman

(57) ABSTRACT

A pet vacuum attachment for a source of vacuum. A generally tubular unit has a filter and a vacuum adjustment valve with a vacuum gauge, the unit being attached at one end to a vacuum source and at the other end to a vacuum hose leading to a vacuum head unit. A vacuum head is in the general shape of a mitt. A suction grooming portion of the head has a wavy rim defining a mitt-shaped suction plenum covered by a grid formed of arrowhead configured grid elements. The grid elements attach at valleys between peaks between outward-extending peaks. The suction grooming portion forms a hose attachment at the mitt wrist. The suction grooming portion has a hand receiving mitt attached along its upper wall. Another suction head is provided in the shape of a flattened trumpet bell having a grid for contact with the coat of a pet.

12 Claims, 7 Drawing Sheets

PET VACUUM ATTACHMENT

BACKGROUND OF THE INVENTION

1. Field of the Invention

The present invention relates to grooming equipment for animals. More particularly, the present invention relates to vacuum grooming equipment for pets having a replaceable filter.

2. Description of the Related Art

Vacuum grooming devices for pets are presently in use. They are particularly useful for removing hair from shedding animals and removing dirt, fleas, etc. Present grooming devices are noisy and unfamiliar to the animal, thus scaring the animal. Those not having filters clog the vacuum machinery with hair. Also, vacuum may be too high, resulting in uncomfortable pulling of the skin of the animal when conventional vacuum sources are employed. Those having a self-contained vacuum source are small and unreliable. It would be desirable to provide a pet vacuum attachment for a vacuum source such as a vacuum cleaner providing for controlled vacuum levels. It would also be desirable to provide such a pet vacuum attachment providing a replaceable filter unit. It would further be desirable to provide a vacuum head which may be worn on the hand of the groom and used in a stroking manner, thus simulating petting of the animal, the noise source of the vacuum being removed from the animal, thus resulting in a calm animal for grooming.

None of the above inventions and patents, taken either singly or in combination, is seen to describe the instant invention as claimed. Thus, a pet vacuum attachment solving the aforementioned problems is desired.

SUMMARY OF THE INVENTION

The pet vacuum attachment of the present invention is designed for attachment to a source of vacuum such as a vacuum cleaner. A generally tubular unit provides for a replaceable filter and a vacuum adjustment valve with a vacuum gauge and is configured to attach at the vacuum adjustment valve to a source of vacuum and at the filter to a conventional vacuum hose of substantial length. A vacuum head unit is provided which is in the general shape of a mitt for stroking the coat of a pet.

A suction grooming portion has a wavy rim defining a mitt-shaped suction plenum covered by a grid formed of arrowhead configured grid elements. The grid elements attach at valleys between peaks along the waves of the rim such that the peaks extend outward from the grid to engage the skin of the pet being groomed, avoiding pulling of the skin. The suction grooming portion forms a vacuum attachment for the vacuum hose at the wrist of the mitt-shaped structure. The suction grooming portion has a hand receiving mitt attached along its upper wall to receive the hand of a groom for grooming the pet by stroking as if petting the animal. Another embodiment of the suction head is in the shape of a flattened trumpet bell having a grid for contact with the coat of a pet. Adjustment of the vacuum applied to the pet by the vacuum adjustment valve avoids pulling the skin of the pet and frightening the pet from excess airflow.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a pet vacuum attachment for attachment to a source of vacuum such as an electric vacuum cleaner or vacuum wall unit. The pet vacuum attachment provides for grooming of a pet. It provides a filter system with a replaceable filter for catching shed hair and the like. The level of vacuum is controllable to avoid discomfort to the pet due to too much suction at the suction head. In a preferred embodiment, the suction head is in the shape of a mitten to provide a familiar stroking action for the pet, thus avoiding scaring the pet. Controlling the level of vacuum also minimizes the sucking sound at the grooming head, thus maintaining the pet in a calm condition, the suction control valve being spatially removed from the pet being groomed. As the filter collects material, the suction control valve may be adjusted to maintain an effective vacuum level.

Figure 1:
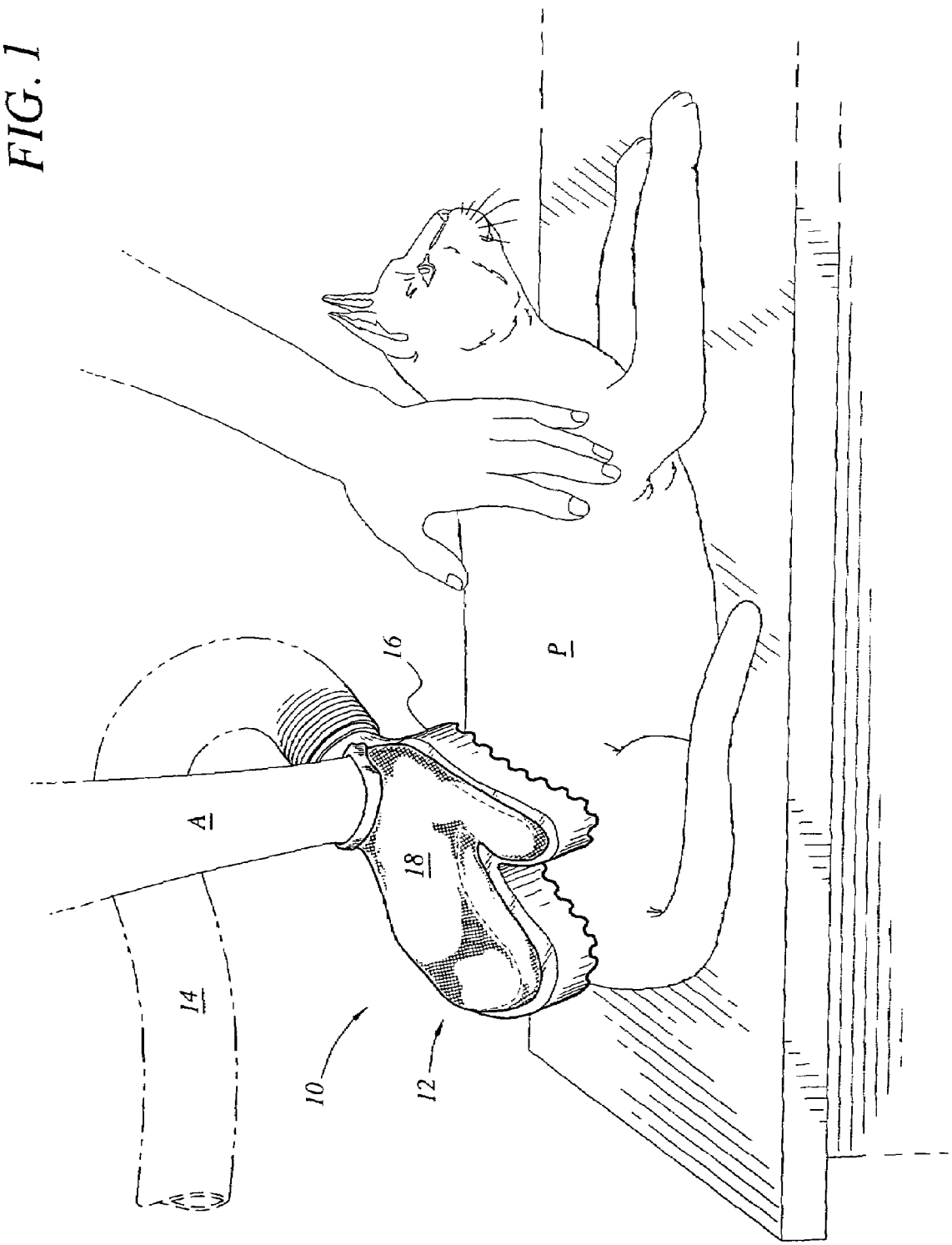
FIG. 1 is an environmental, perspective view of the grooming mitt of the pet vacuum attachment according to the present invention.
Figure 2:
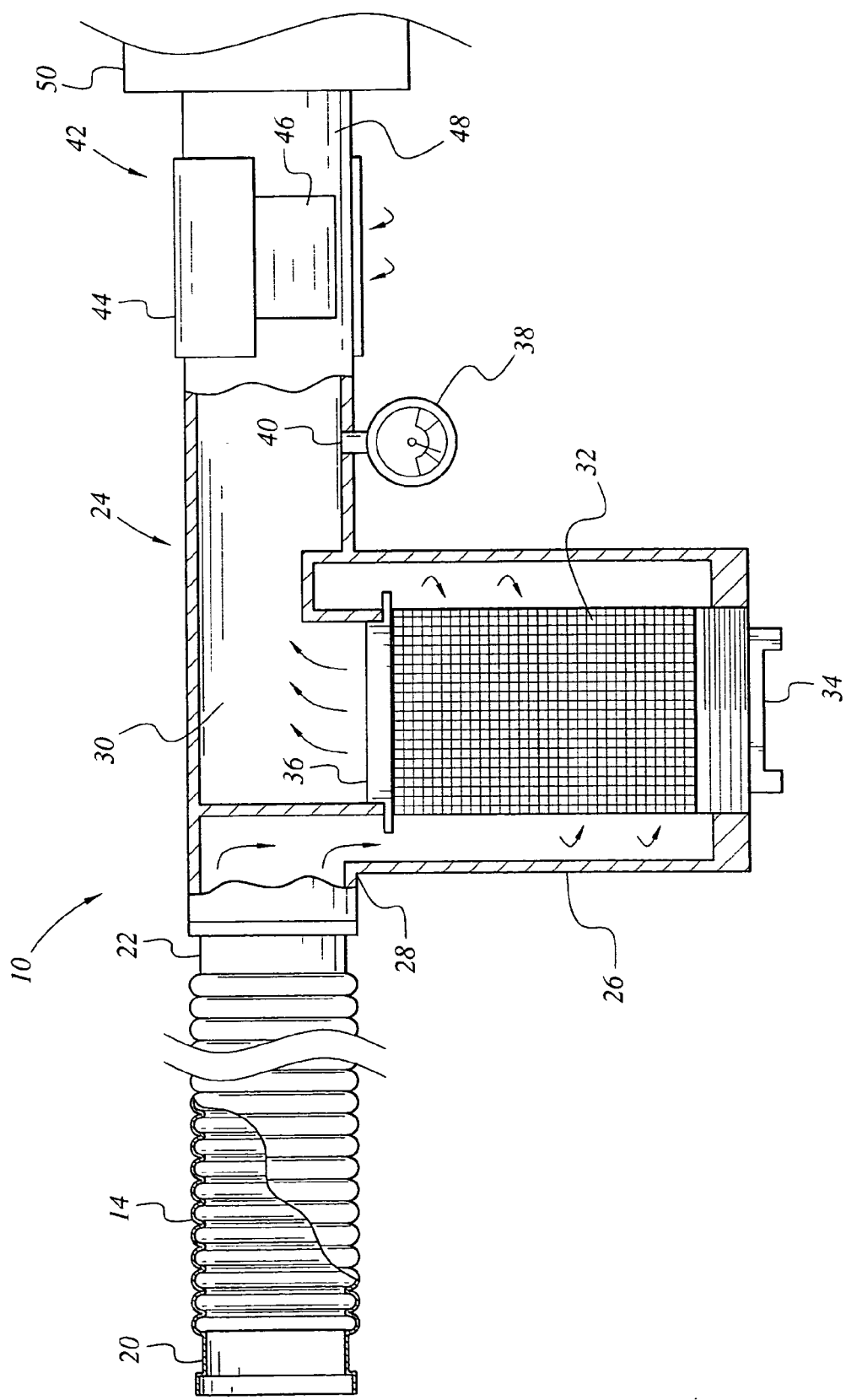
FIG. 2 is a diagrammatic view of the filtration and vacuum adjustment unit of the pet vacuum attachment according to the present invention.

Referring To FIG. 1, pet P is shown being groomed by the mitt-shaped vacuum head 12 of pet vacuum attachment system 10 (see FIG. 2 for remainder of system 10). A vacuum hose 14 is attached to the vacuum head 12 at the cylindrical outlet portion of suction grooming portion 16 having the general shape of a hand mitt. The hand mitt allows the groom to stroke the animal as in petting, which is familiar to the animal. The hand of the arm A of the groom is inserted into the hand receiver 18 which is attached to the upper side of the suction grooming portion 16.

Referring to FIG. 2, there is shown a side elevation view, partly in section, of the filtration and vacuum adjustment valve unit 24 of pet vacuum system 10 (see FIG. 1 for vacuum head) as attached to vacuum hose 14 having a vacuum head connection 20 and a filtration and vacuum adjustment valve unit connection 22. Unit 24 is generally tubular in configuration having filter section, a vacuum gauge section and a vacuum adjustment valve section leading to a vacuum source connector 50. The vacuum hose 14 is preferably of substantial length such as eight feet to remove the vacuum noise from the grooming area, thus maintaining the pet in a calm condition.

The filter section includes a filter housing 26 extending normal to the tubular unit 24 formed in part by conduit 48 and having an air inlet 28 for airflow from hose 14 and an air outlet 30 on the downstream side of filter 32. Filter 32 is annular in form and of common construction. Filter 32 may be removed and replaced by removing filter removal cap 34. When filter cap 34 is tightened, annular filter 32 is sealed against upper peripheral seal 36.

The vacuum gauge section has a vacuum gauge 38 connected by means of connection stem 40 through the tubular wall of unit 24 to the interior thereof to measure the vacuum level at which system 10 is operating. The vacuum adjustment valve section has concentric sleeve valve 42 of the type commonly used in vacuum cleaners, having a sleeve 44 which adjusts to cover inlet aperture 46 and thus adjusting the vacuum level in the system 10. Conduit 48 opens into vacuum source connector 50 for connection to a vacuum cleaner, wall unit, or the like (not shown).

Figure 3A:
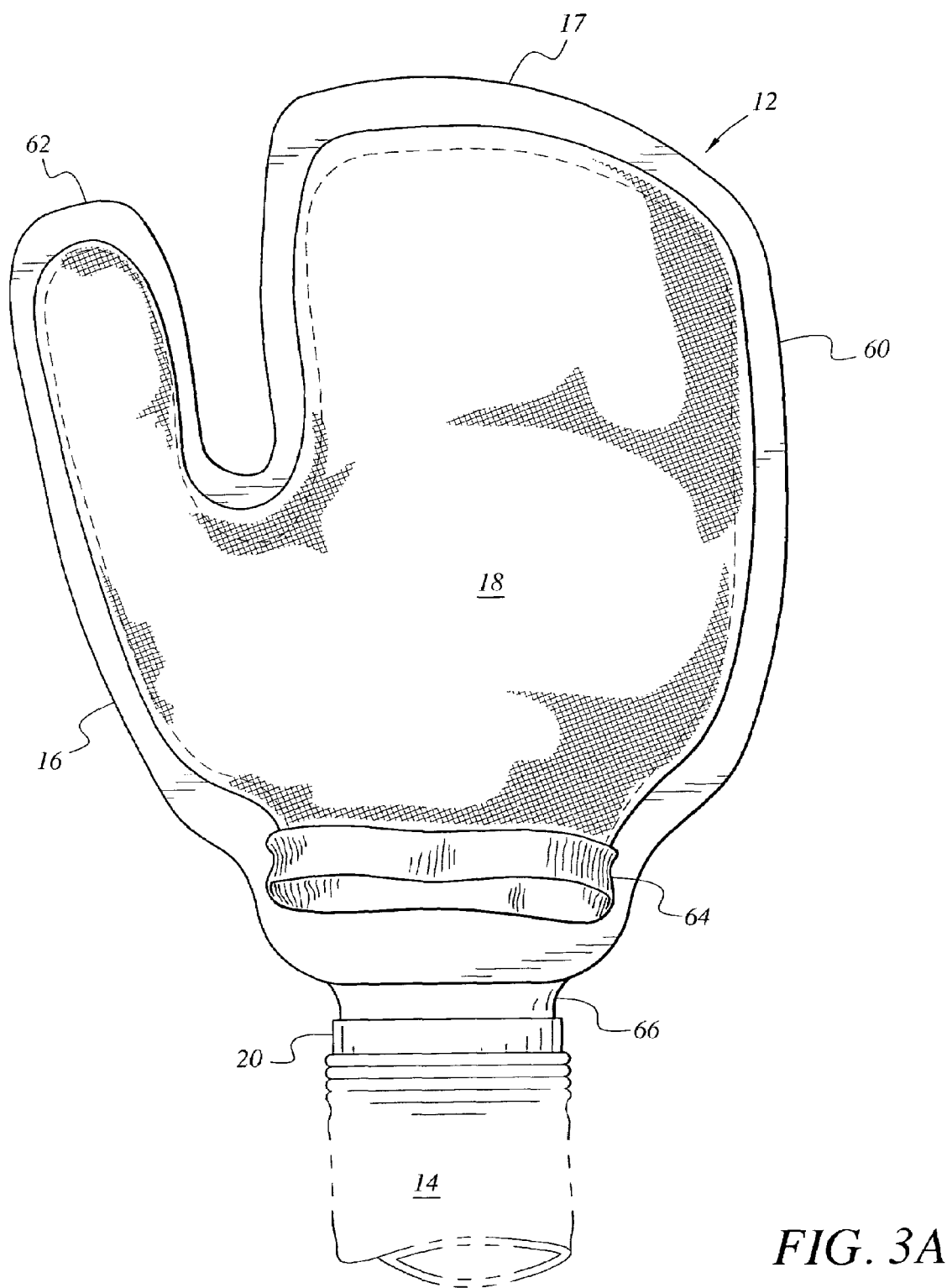
FIG. 3A is a plan view of the vacuum mitt head of FIG. 1.
Figure 3B:
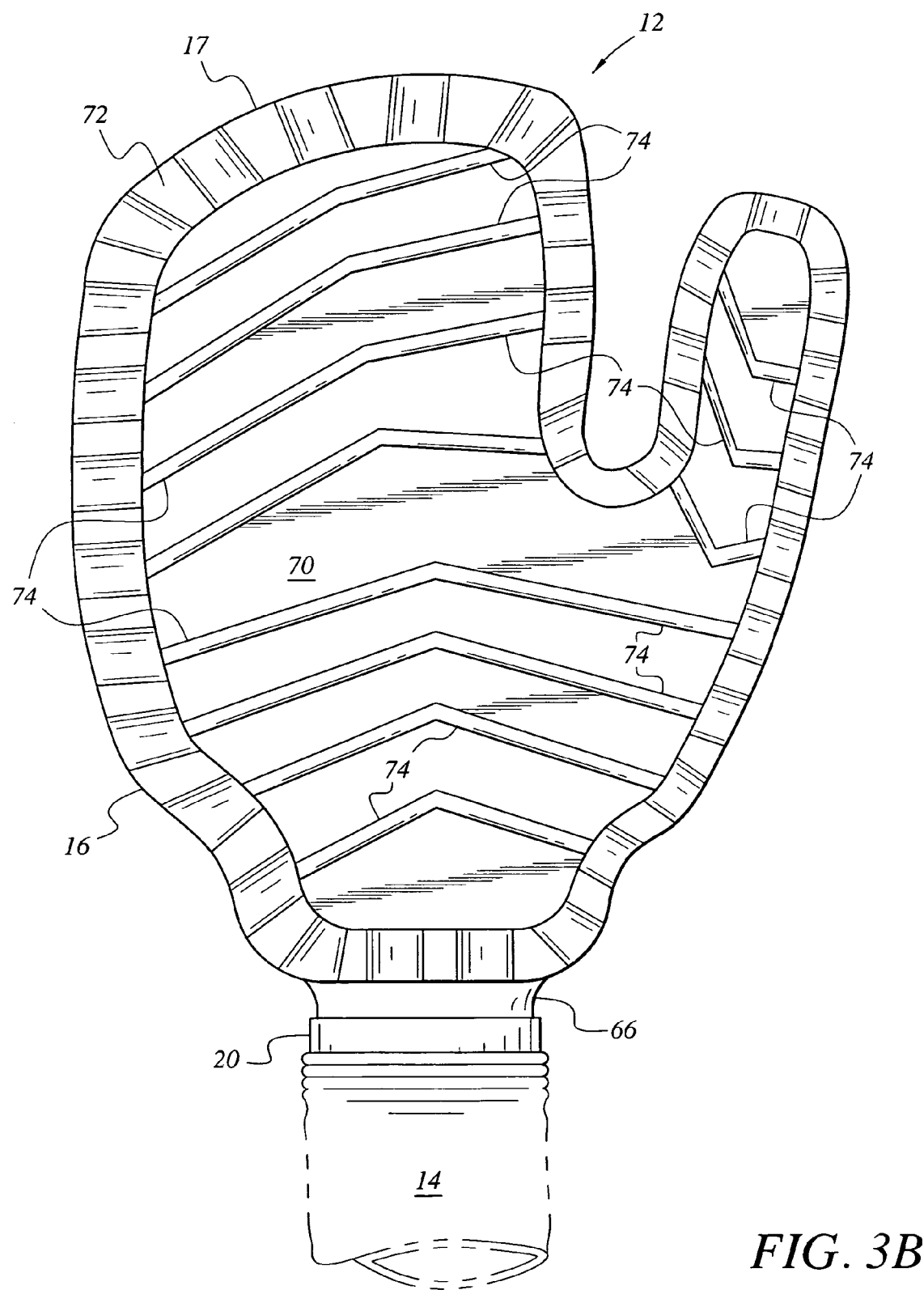
FIG. 3B is a palm-up view of the vacuum mitt head of FIG. 1.
Figure 3C:
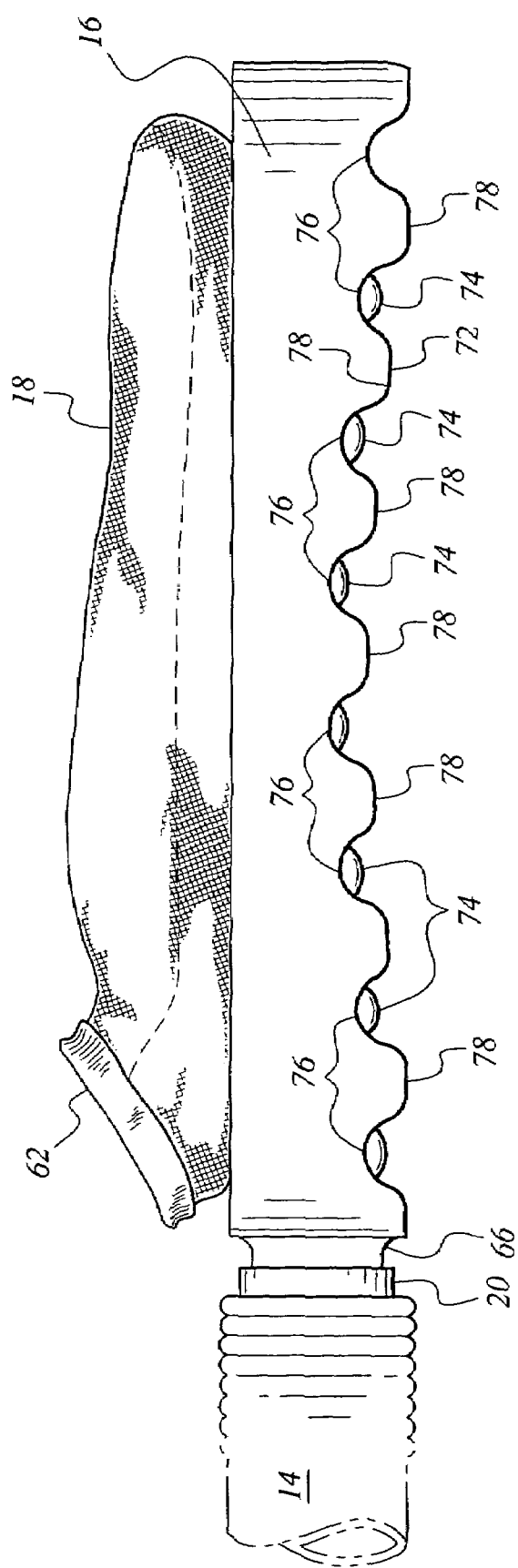
FIG. 3C is a side elevation view of the vacuum mitt head of FIG. 1.

Referring to FIGS. 3A, 3B, and 3C, there is shown a plan view, a bottom view, and a side elevation view, respectively, of the mitten-shaped vacuum head 12 as mounted on hose 14. Head 12 includes a generally mitten-shaped suction grooming portion 16 which is generally planar, extending from vacuum connector 66 to finger end 17. Suction grooming portion 16 has a finger portion 60 and a thumb portion 62 and forming a cylindrical vacuum hose connector 66 for connection to hose connection 20 and hose 14. Suction grooming portion 16 has an upper wall along which is attached mitt-like hand receiver 18.

Suction grooming portion 16 defines an inlet plenum 70 (see FIG. 3B) having a finger portion, a thumb portion, and a palm portion operatively connected with cylindrical outlet portion 66 and taking the general shape of the mitten-shaped grooming portion 16. Suction grooming portion 16 has an outer rim 72 defining the shape of inlet plenum 70. The surface of outer rim 72 is waved, forming valleys 76 and peaks 78. Elongated pliable grid elements 74 extend between valleys on opposed sides of rim 72, forming a grill. As is shown, the individual grid elements 74 form an arrow shape pointing away from the hose connector 66 which enables lifting of the fur or hair of the pet during a stroking motion. The grid elements 74 in the thumb area point inward, allowing the groom to lift the hair in restricted access area of the pet P such as around the legs by pulling the thumb portion toward the groom in the restricted area.

As best seen in FIG. 3C grid elements 74 are preferably connected to rim 72 at valleys 75 between peaks 76 so as to allow the peaks 78 to extend outward from the grill formed by grid elements 74. The outward-extending peaks prevent the suction head from pulling the skin of the pet by vacuum. The suction grooming portion 16 is preferably slightly concave in shape as seen in FIG. 3C to better fit the curves of an animal body. The suction grooming portion 16 is preferably made of hard plastic while the grid members 74 are made of flexible plastic. The hand receiver 18 may be made of any flexible material suitable for a glove such as woven cloth or leather.

Figure 4A:
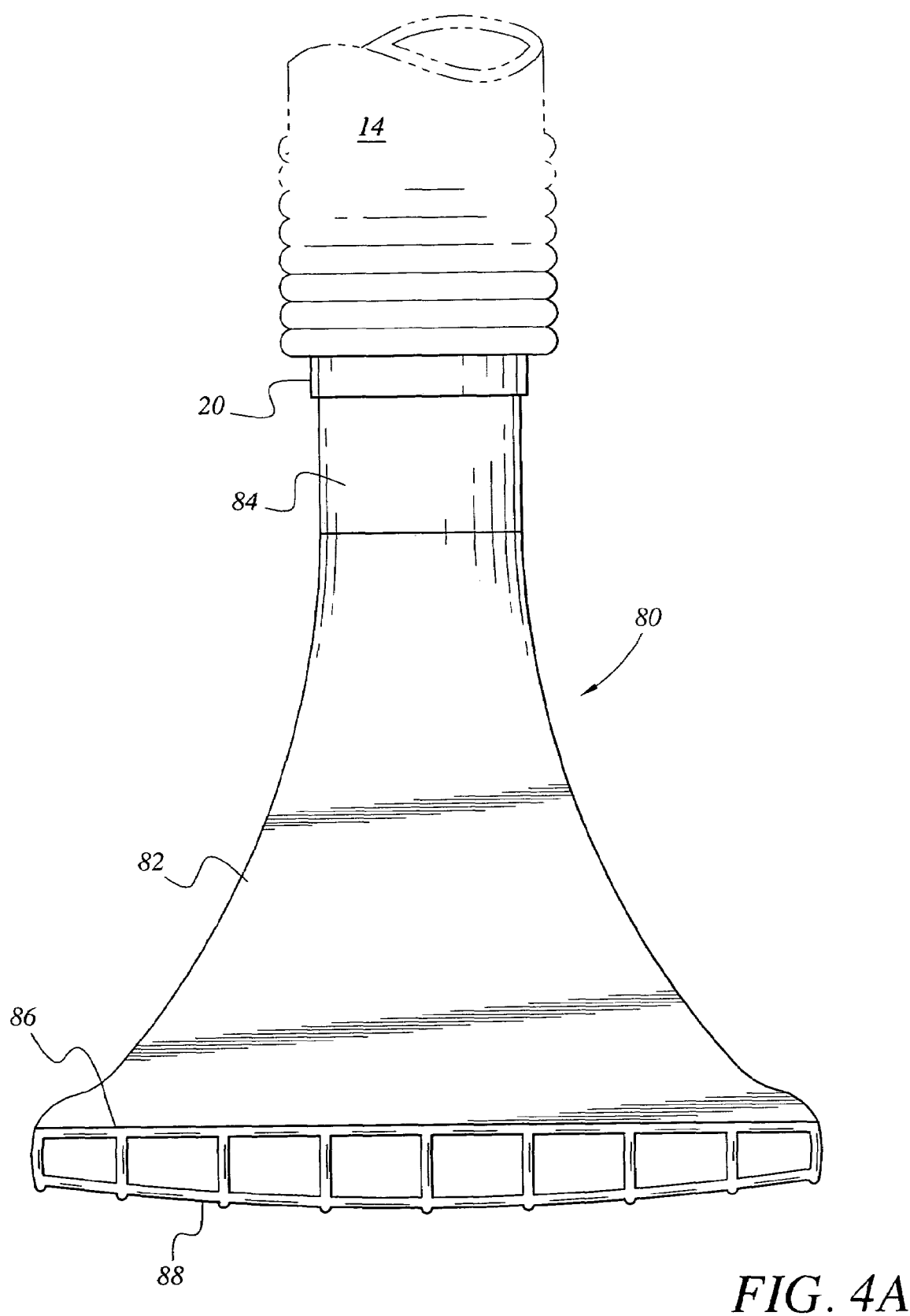
FIG. 4A is a side elevation view of another embodiment of the suction head of the present invention having a trumpet shape.
Figure 4B:
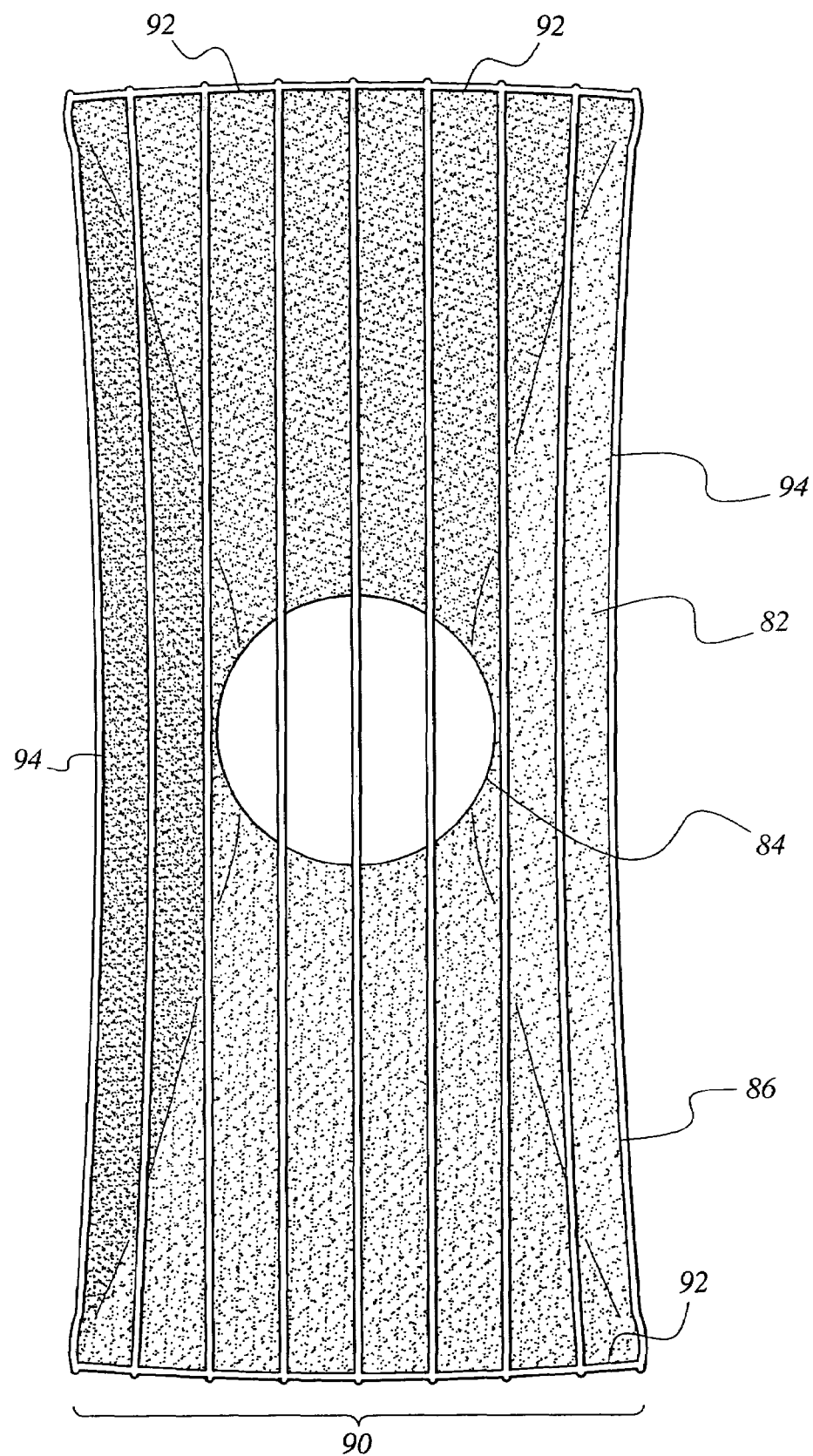
FIG. 4B is a bottom view of the trumpet-shaped suction head of FIG. 4A.

Referring to FIGS. 4A and 4B, there is shown a side elevation and a bottom view, respectively, of another embodiment of the vacuum head of the present invention. Trumpet suction head 80 is in the general shape of a flattened trumpet bell having a grill for contact with the coat of a pet. Adjustment of the vacuum applied to the pet by the vacuum adjustment valve avoids pulling the skin of the pet and frightening the pet from excess airflow. a flared portion extends outward from cylindrical hose attachment portion 84 and ending in a generally rectangular suction head portion 86. The suction head portion is preferably convex in shape as seen in FIG. 4A, having a grill 88 formed of pliable grid elements 90. The convex shape prevents the entire suction head from engaging the coat of the pet a one time, avoiding pulling on the skin. The suction head ends are slightly convex while the suction head sides 94 are slightly concave as shown. The hose attachment portion 84 is configured to fit within vacuum unit connection 20 of vacuum hose 14. The suction head 80 is preferably made of suitable hard plastic with flexible grid elements 90 extending lengthwise between the suction head ends 92.

It is to be understood that the present invention is not limited to the embodiments described above, but encompasses any and all embodiments within the scope of the following claims.

I claim:

1. A pet vacuum attachment to a vacuum source, comprising:
    an elongate, tubular member having a suction end and a vacuum source connection end;
    said elongate tubular member comprising:
        a vacuum hose connection at said suction end;
        a filter section;
        a vacuum adjustment valve section; and
        a vacuum source connection at said vacuum source connection end;
        said vacuum adjustment valve section being located between said filter section and said vacuum source connection;
    a vacuum head having an inlet grid and a generally cylindrical outlet; and
    a vacuum hose operatively connecting said vacuum head cylindrical outlet and said suction end vacuum hose connection;
    whereby, the vacuum level is adjusted at said vacuum adjustment valve section to avoid pulling the skin of a pet being groomed by said vacuum head; and
    whereby an adequate vacuum level is maintained at said vacuum head as resistance to air flow builds up in said filter section by adjusting the vacuum level at said vacuum adjustment valve section.

2. The pet vacuum attachment of claim 1, further comprising a vacuum gauge section located between said vacuum adjustment valve section, said vacuum gauge section having a valve providing a vacuum level readout.

3. The pet vacuum attachment of claim 1, said filter section having a replaceable filter.

4. The pet vacuum attachment of claim 3, said filter section having a filter housing normal to said tubular member and a removable lid for access to said filter section for removal and replacement of said replaceable filter.

5. The pet vacuum attachment of claim 3, said vacuum adjustment valve section being a concentric rotatable sleeve type valve mounted on said tubular member.

6. The pet vacuum attachment of claim 1, said vacuum head having the general shape of a hand mitten, said mitten head having a generally mitten-shaped suction grooming portion being generally planar in shape, having an upper wall and having a thumb portion a finger portion defining a finger tip end, and a palm portion leading to a generally cylindrical outlet portion, said mitten-shape suction grooming portion defining an inlet plenum operatively connected with said generally cylindrical outlet portion, said mitten head having a mitten-shaped hand receiver attached to said mitten-shaped suction grooming portion along said upper wall, whereby a groom wearing the hand receiver may control the position of and apply appropriate pressure to the suction grooming portion during the grooming of a pet.

7. The pet vacuum attachment of claim 6, wherein said suction grooming portion has an outer rim defining said plenum.

8. The pet vacuum attachment of claim 7, wherein said outer rim has a repeating wave surface.

9. The pet vacuum attachment of claim 8, further comprising a plurality of elongate grid elements extending between opposite portions of said outer rim forming a grill over said plenum.

10. The pet vacuum attachment of claim 9, said elongate grid elements being spaced along said mitten from said cylindrical outlet portion to said finger tip end portion of flexible material and having the form of an arrowhead shape, said grid elements being mounted at their respective ends at the respective valleys formed in said outer rim.

11. The pet vacuum attachment of claim 7, said rim being slightly concave in shape between said cylindrical outlet portion and said fingertip end thereof.

12. A pet vacuum attachment to a vacuum source, comprising:
   an elongate, tubular member having a suction end and a vacuum source connection end;
   said elongate tubular member comprising:
      a vacuum hose connection at said suction end;
      a filter section having a replaceable filter;
      a vacuum gauge section having a valve providing a vacuum level readout;
      a vacuum adjustment valve section; and
      a vacuum source connection at said vacuum source connection end;
   a vacuum head having an inlet grid and a generally cylindrical outlet, said vacuum head having the general shape of a hand mitten, said mitten head having a generally mitten-shaped suction grooming portion being generally planar in shape, having an upper wall and having a thumb portion a finger portion defining a finger tip end, and a palm portion leading to a generally cylindrical outlet portion, said mitten-shape suction grooming portion defining an inlet plenum operatively connected with said generally cylindrical outlet portion, said mitten head having a mitten-shaped hand receiver attached to said mitten-shaped suction grooming portion along said upper wall, whereby a groom wearing the hand receiver may control the position of and apply appropriate pressure to the suction grooming portion during the grooming of a pet; and a vacuum hose operatively connecting said vacuum head cylindrical outlet and said suction end vacuum hose connection;

whereby, the vacuum level is adjusted at said vacuum adjustment valve section to avoid pulling the skin of a pet being groomed by said vacuum head; and whereby an adequate vacuum level is maintained at said vacuum head as resistance to air flow builds up in said filter section by adjusting the vacuum level at said vacuum adjustment valve section.

* * * * *